Oct. 1, 1963   A. KATZ   3,105,322
TABLECLOTHS AND THE LIKE AND METHOD FOR MAKING
Filed Dec. 31, 1962   2 Sheets-Sheet 2
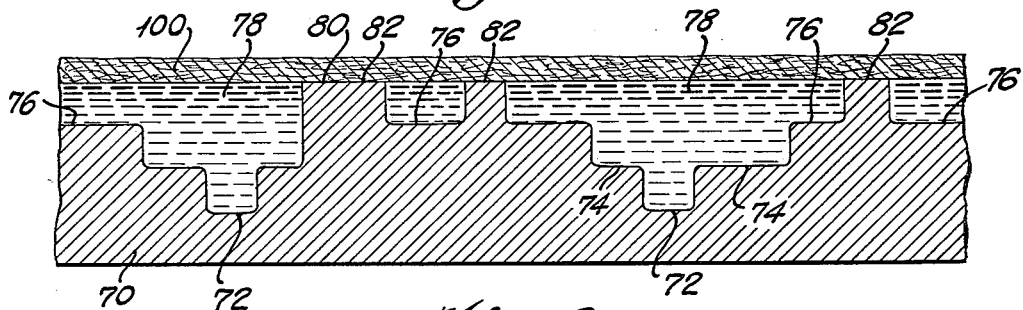
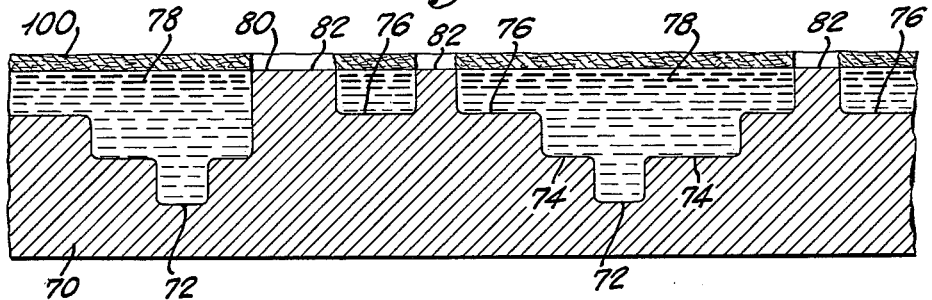
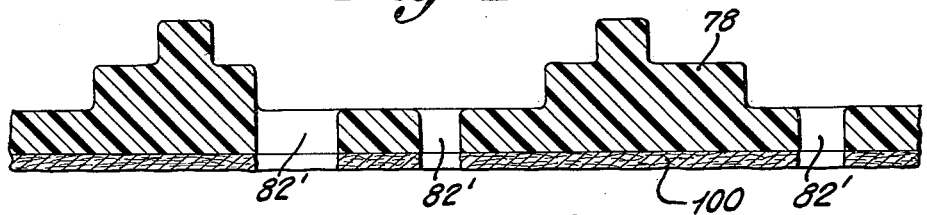
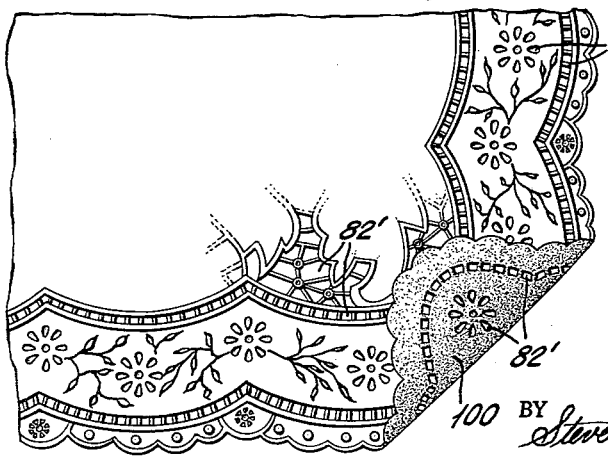
INVENTOR
Alexander Katz
BY Stevens, Davis, Miller & Mosher
ATTORNEYS

United States Patent Office 3,105,322
Patented Oct. 1, 1963

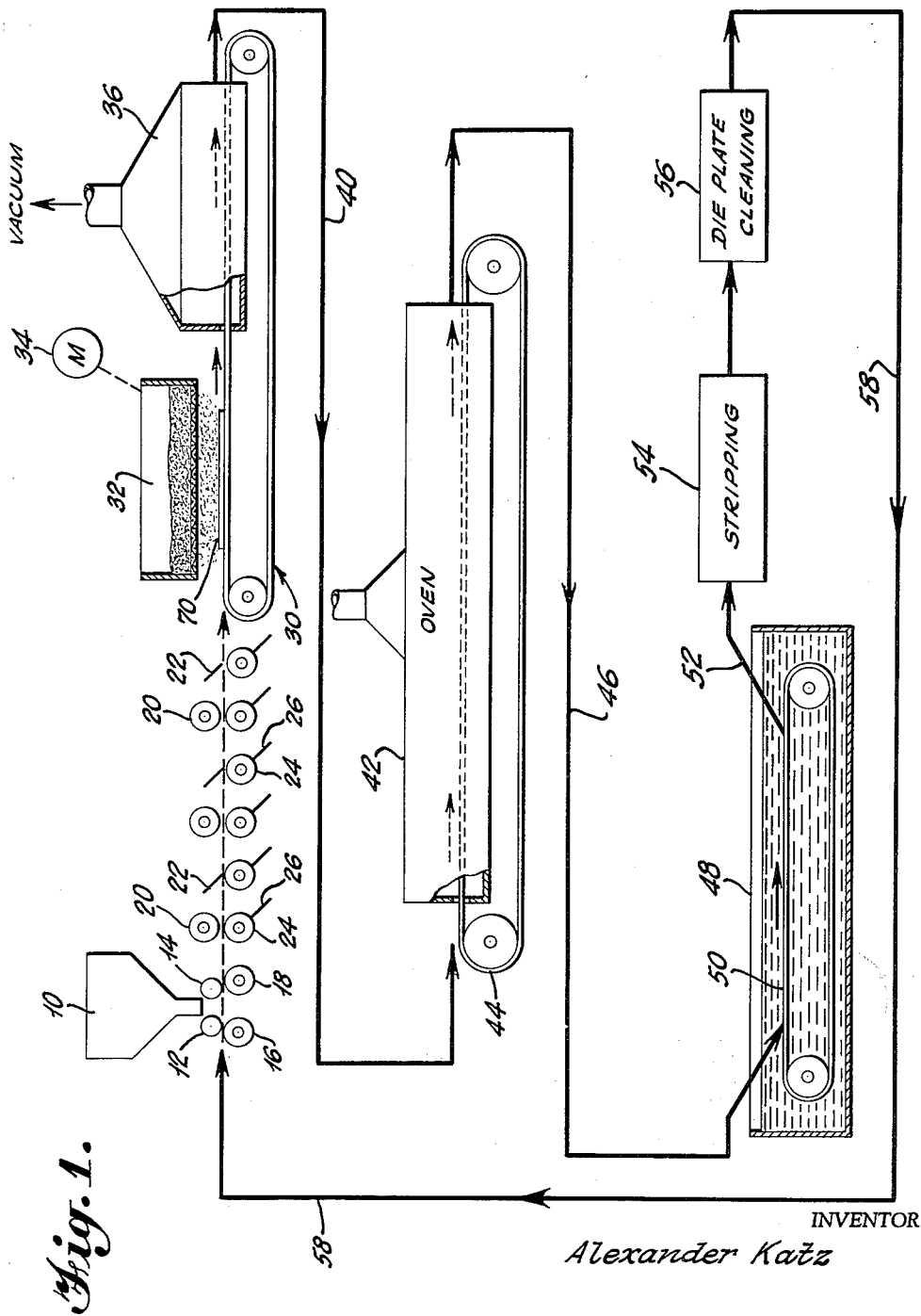

3,105,322
TABLECLOTHS AND THE LIKE AND METHOD
FOR MAKING
Alexander Katz, New York, N.Y., assignor to EFKA Plastic Corporation, Bayonne, N.J., a corporation of New Jersey
Filed Dec. 31, 1962, Ser. No. 248,504
5 Claims. (Cl. 45—68.3)

The present invention relates to a method of making a fiber backed plastic sheeting or film and to the article produced by said method, and more particularly, to a method of making flock backed plastic tablecloths, doilies, curtains and the like characterized by a pattern in relief on one face including openings in the plastic tablecloth and further characterized by a flock or fibrous material bonded to the opposite face in a manner leaving the openings in the tablecloth unobstructed and to tablecloths, doilies, and the like so characterized.

It is already known in the art to produce plastic sheeting containing a prescribed pattern which includes holes in the plastic sheeting and further it is already known that flock or fibrous material can be applied to a plastic sheeting by first coating a binder or cement to one face of the sheet and thereafter applying staple fibers such as flock or other fibrous material to the binder or cement thereby effectively to attach the fibrous material to the plastic sheeting.

It is the principal object of the present invention to provide a technique or method for felting, sueding or flocking a plastic film or sheet without the necessity of coating with a binder. The present invention provides a method whereby the felting, sueding or flocking can be accomplished prior to curing of the plastic film forming composition and then curing to eliminate wholly the necessity for using a binder.

In accordance with the present invention, a method is provided including the basic steps of flooding a die plate of appropriate design with a suitable plastic film forming composition, the die plate being characterized by an etched out pattern wherein the composition is intended to fill the etched out areas to the plane or the surface of the die plate, wiping excess plastic material from the die plate so that all portions of the die plate lying in the plane of the surface of the die plate are wiped completely free of composition to the extent necessary to leave such portions substantially dry, applying staple fibers, such as flock, to the die plate effectively flooding same, and then removing excess fibers including removing all fibers from all portions of the die plate which lie in the plane of the surface of the die plate. Hence, portions of the die plate within the confines of the pattern area which lie in the plane of the surface of the die plate contain neither composition nor fibers. Following removal of excess fibers, the die plate is then run through a curing cycle comprised of feeding the plate through an elongated oven maintained at a temperature sufficient to effect curing of the plastic composition. The dwell time in the oven and the temperature of the oven is preselected to effect optimum curing of the plastic composition. During the curing step of the process, the fibrous material in contact with the plastic composition will become bonded and securely attached thereto. After the curing step, the die plate is passed through a cooling step which may comprise a water bath, and thereafter, the cured plastic film or sheet is stripped from the die plate. The die plate is then cleaned wtih solvents and brushes and returned or recycled to the first step of the process and reused.

Accordingly, it is an object of the present invention to provide a method for making tablecloths, doilies and the like in the form of a plastic film or sheeting, one surface of which is felted, sueded or flocked without the necessity for employing a binder for this purpose.

It is a further object of the present invention to provide a method as above described wherein the application of staple fibers or flock to a vinyl film or sheet can be accomplished prior to curing of the film or sheet.

The further object of the present invention is a novel tablecloth, doily, or the like comprised of a sueded, flocked, or felted plastic film or sheet wherein staple fibers are bonded directly to the plastic composition on its back face and wherein the plastic sheet is characterized by openings in a prescribed pattern which are unobstructed by fibers.

Other and further objects of the present invention will become more readily apparent from the following description of a preferred embodiment of the present invention when taken in conjunction with the appended drawings in which:

FIGURE 1 is a flow diagram illustrating the process of the present invention;

FIGURE 2 is a view in cross section through a typical die plate illustrating its condition immediately after being flooded with staple fibers;

FIGURE 3 is a view similar to FIGURE 2 showing the condition of the die plate at that stage in the process after leaving the step of excess fiber removal;

FIGURE 4 is a view in cross section through the finished article showing the plastic film or sheet flocked felted or sueded on its back face with its front face describing a relief pattern and being further characterized by openings within the confines of the pattern; and FIGURE 5 is a view in plan of a tablecloth with one corner turned back embodying the present invention.

Referring now to the drawings in detail, a flow diagram of the process of the present invention is illustrated in FIGURE 1. As will be evident, clean die plates are received by a conveyor means and advanced beneath a coating stage comprised of a hopper 10 discharging between a pair of coating rollers 12 and 14. Back up rollers 16 and 18 constitute a portion of the conveyor means and are adapted to moving a die plate laterally, transversely or horizontally beneath the opening defined between the rollers 12 and 14. The hopper 10 contains a plastic film forming composition of any suitable type, such as a vinyl chloride composition containing resin, filler, stabilizer, plasticizer, and solvent in suitable proportions such that the composition can be heat cured into a plastic sheet or film. The composition in the hopper 10 is in the form of a liquid and readily flows out the bottom of the hopper 10 by gravity between the coating rollers 12 and 14 and floods the die plates that are passing beneath.

The die plates leaving the coating zone are advanced by the conveyor means through a series of wiping and drying zones for the purpose of removing all the excess composition leaving composition only on those areas of the die plate that have been etched out below the top plane of the plate. The wiping and drying steps are carried out by a series of rollers 20 acting on the top surface of the die plates, wiper blades 22 acting on the top surface of the die plate and back up and driven rollers 24 each provided with a doctor blade 26. The die plates pass between the rollers 20 and wiper blades 22 on the top and back up rollers 24 on the bottom. Rollers 24 are driven by any suitable mechanical arrangement and constitute part of the conveyor means. Each wiping and drying stage consists of a wiper blade 22, a roller 20, 2 rollers 24 and 2 doctor blades 26, and a plurality are essential to removal all excess plastic from the die plate and leave the portions of the die plate which lie in the plane of the top surface of the die plate in a condition free of plastic material and dry.

The die plates issuing from the wiping and drying zones are passed by a conveyor means 30 beneath a vibrating screen 32 driven by a motor 34. The vibrating screen contains a supply of staple fibers having a length of from about 1/32" to about 3/32". As the die plates pass beneath the vibrating screen 32, the motor 34 acts to vibrate the screen 32 and thereby fibers are shaken onto the die plates. It will be appreciated that the manner of application of the fibers may be otherwise, and it is conceivable that the fibers may be blown into the die plates or applied by hand or otherwise. By any means, a large excess of fibers are received by the die plates.

The conveyor 30 then advances the die plates through a vacuum chamber 36 operated at slight vacuum wherein excess fibers are sucked up and removed from the die plates. Within the vacuum chamber, those fibers will be removed from the die plate which are not in physical contact with composition contained on the die plates. Hence, any portions of the die plates which extend to the plane of the top surface of the die plates will have fibers removed from it, since any such portions will be free of any composition and will be dry.

The die plates are then advanced to an oven by any suitable means and this is shown in the flow diagram by the line 40. The die plates advance through oven 42 by means of conveyor 44 and the rate of travel of the conveyor is determined such that the die plates remain in the oven for a period of time sufficient to effect curing of the composition contained on the die plates. Typical oven temperatures to produce polyvinyl chloride films would be from 350° F. to 400° F. and the time of cure would be from 10 seconds to 5 minutes.

After leaving the oven, the die plates are advanced, as indicated by line 46, to a water bath generally designated by the reference numeral 48. The die plates are received upon a conveyor 50 in the water bath 48 and move through the water bath and are discharged at the opposite end and advanced, as designated by line 52 to stripping stage 54. This stripping operation is normally carried out manually. The stripped die plates are then advanced to a die plate cleaning stage 56 and treated chemically with solvents and mechanically with brushes and knives to remove all plastic material. The cleaned die plates are then returned or recycled to the coating stage as indicated by single line 58.

The amount of staple fibers applied to the die plates may vary but is approximately one ounce per square yard of pattern area. This figure may vary somewhat although not greatly, depending upon the density of the fibers utilized and the amount of such fibers that actually come into contact with the composition. It will be appreciated that if the plastic film or sheet that is being produced is characterized by a large number of openings, this will have a significant affect upon the weight of the fibers that will be utilized per square yard of pattern area.

Referring to FIGURE 2 of the drawings, a typical die plate 70, is shown having deep etched out regions 72, intermediate etched out regions 74 and shallow etched out regions 76. The plane of the top of the die plate has been designated by the reference numeral 80. The unetched portions of the top surface of the die plate have been designated by reference numeral 82. When the composition is flooded onto the die plate, it will fill all of the etched out areas and will also be present on the portions 82 of the die plate. As the die plate is advanced through the wiping and drying steps of the process, all composition is removed from the die plate except from etched out regions. Hence, the composition is removed completely from all areas 82 as illustrated in FIGURE 2. By the technique of feeding the die plate through a succession of wiping and drying stages as previously described, the areas 82 on the surface of the die plate are left free from composition and dry. Staple fibers are then flooded into the top surface of the plate as indicated by the reference numeral 100. It will be apparent that the fibers cover the top surface of the plate completely, but only a portion of them are in contact with the remaining composition 78. Since the cleaned off areas have been carefully treated to be dried, when the die plate 70 is advanced through the vacuum chamber 36, all excess fibers are removed. In actual fact, all fibers are removed from the areas 82, and only the upper portion of the fibers overlying the composition. The only fibers left remaining are those which are in contact with the composition 78 still contained in the die plate. The condition of the die plate upon emergence from the vacuum chamber 36 is portrayed in FIGURE 3.

Following curing and cooling, the articles are stripped from the die plates and the article derived from the die plate 70 illustrated in FIGURES 2 and 3 is shown in FIGURE 4. It will be noted that it is exactly complementary to the etched out pattern in the upper surface of the die plate and that it is characterized by a relief pattern on one face, its upper face, and by a plane surface on its back face. The back face is also flocked, that is to say, the staple fibers are in direct bonded contact with the back and do not project into the cut out areas corresponding with areas 82 of the die plate. Such areas comprise openings in the plastic sheet, as shown in FIGURE 4, and these openings have been designated by the reference numeral 82'.

The staple fibers that are applied may be either cotton, rayon or the like and it should be understood that it is within the purview of the present invention that the plastic composition or resinous composition employed by the present invention may take many forms. Hence, the composition may be a variety of any plastic film forming composition normally contemplated as suitable for tablecloths and the like. More particularly, the resin employed may be vinylchloride, styrene, urethane, vinyl acetate, vinyl alcohol or others.

*Example*

In order to afford a more complete understanding of the present invention, a specific example will be given illustrating the method and article. A tablecloth approximately 54" x 54" is prepared utilizing four die plates, each, comprising an etched out quarter section of the intended pattern with the pattern area constituting 27" on each side. The overall die plate is 36" wide and 36" long and thus, a margin is provided around the pattern area of approximately 4". Each die plate is fed through the process in the manner previously described and is first flooded with a composition comprised of 57 parts by weight of vinyl chloride resin, 5 parts by weight of filler, 9 parts by weight of stabilizer, one part by weight of reodorant with the balance comprised of dioctyl phthalate. The resinous or plastic composition is in the form of an emulsion that is milky in color and is slightly viscous. The excess composition is removed from the four die plates by a series of wiping and drying operations as previously described, six in number, at the conclusion of the six wiping and drying operations, performed in the manner previously described, all excess composition is removed from the plates except in the etched out or pattern areas and all portions of the die plates that lie in the plane of the top surface are free of composition and are dry. The die plates are then advanced beneath a vibrating screen 42" in width and 48" long and fibers of a length of 1/32" are shaken onto the plates as they pass beneath the vibrating screen on a conveyor belt. The entire top surface of each plate is flooded with the staple fibers and the die plates are then passed through a vacuum chamber operated at slightly below atmospheric pressure and the excess fibers are readily removed from the die plates leaving only fibers in actual contact with the remaining composition. The die plates are then passed on a conveyor through an oven heated to 370° F. and remain in the oven for a period of 30 seconds and are then immersed in a water bath maintained at room temperature for a period of 15 seconds. The cured plastic films are stripped from the four die plates and are heat sealed together by a conventional heat sealing machine. The result is a polyvinyl tablecloth in sheet form having a relief pattern on one surface and a felt or flocked back with no flocking being present in the various openings defined in the plastic tablecloth.

Any technique may be employed to make the die plates, such as photolithographic processes and the like, and since producing etched out die plates is within the purview of the art and since making die plates forms no part of the invention, no details of processing are here included.

Although the present invention has been shown and described in terms of a specific preferred embodiment, it will be appreciated that changes and modifications are possible which do not in fact depart from the inventive concepts herein taught. Such are deemed to come within the purview of the invention.

What is claimed is:

1. A plastic tablecloth doily, curtain or the like defining openings therethrough and staple fibers embedded in one face of the tablecloth or the like leaving said openings unobstructed.

2. An article as defined in claim 1 wherein said fibers are of a length of from about $\frac{1}{32}''$ to about $\frac{3}{32}''$.

3. An article as defined in claim 2 wherein approximately one ounce of fibers is contained on each square yard of said article.

4. A plastic tablecloth doily, curtain or the like defining openings therethrough and a relief pattern on one face and staple fibers embedded in the opposite face of said tablecloth or the like leaving said openings unobstructed.

5. A polyvinyl chloride plastic tablecloth doily, curtain or the like defining openings therethrough and a relief pattern on one face and staple fibers embedded in the opposite face of said tablecloth or the like leaving said openings unobstructed.

References Cited in the file of this patent

UNITED STATES PATENTS

| | | |
|---|---|---|
| 2,592,602 | Saks | Apr. 15, 1952 |
| 2,691,611 | Saks | Oct. 12, 1954 |
| 2,718,207 | Garrison | Sept. 20, 1955 |
| 2,784,630 | Koprow et al. | Mar. 12, 1957 |
| 2,793,136 | Root | May 21, 1957 |
| 2,966,437 | Loui et al. | Dec. 27, 1960 |
| 2,981,588 | Haber | Apr. 25, 1961 |